(12) United States Patent
Raipurkar et al.

(10) Patent No.: US 7,222,133 B1
(45) Date of Patent: May 22, 2007

(54) METHOD FOR REDUCING DATABASE RECOVERY TIME

(75) Inventors: Anagha Raipurkar, Foothill Ranch, CA (US); Alma Navarro de Jesus, Monrovia, CA (US); Donald Ralph Hart, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 464 days.

(21) Appl. No.: 10/772,567

(22) Filed: Feb. 5, 2004

(51) Int. Cl.
*G06F 17/30* (2006.01)

(52) U.S. Cl. ............... 707/200; 707/202; 707/203; 707/204

(58) Field of Classification Search ......... 707/200, 707/201, 202, 203, 204
See application file for complete search history.

(56) References Cited

U.S. PATENT DOCUMENTS

| 5,893,117 | A | 4/1999 | Wang |
| 5,974,425 | A | 10/1999 | Obermarck et al. |
| 6,078,930 | A | 6/2000 | Lee et al. |
| 6,178,428 | B1 | 1/2001 | Pystynen et al. |
| 6,374,267 | B1 * | 4/2002 | Tam ............ 707/204 |
| 6,411,969 | B1 * | 6/2002 | Tam ............ 707/204 |

* cited by examiner

*Primary Examiner*—Jeffrey Gaffin
*Assistant Examiner*—Farhan Syed
(74) *Attorney, Agent, or Firm*—Alfred W. Kozak; Charles A. Johnson; Richard J. Gregson (57) ABSTRACT

A method is provided to automatically select the correct order of backups from selected DUMP files in order to recover and rebuild a complete database in reduced time without requiring the user to search, find and select the correct order of items for the backup.

8 Claims, 6 Drawing Sheets

1. DUMPDIRECTORY

METHOD FOR REDUCING DATABASE RECOVERY TIME

CROSS-REFERENCES TO RELATED APPLICATIONS

This application is related to an issued U.S. Pat. No. 6,374,267 entitled "Method Of Selecting And Utilizing Numerically Identified Files For Database Recovery", which is incorporated herein by reference.

FIELD OF THE INVENTION

The method of the present invention implements the ability to automatically select a logical set of database backups from a DUMPDIRECTORY to perform database recovery.

BACKGROUND OF THE INVENTION

In the operation of computer systems and networks, the computer data is often "backed-up", that is to say, it is copied to a storage medium other than the central computer's storage disk in order to permit the recovery of the data as the data existed at some point in time. This is done for purposes of diagnosis in the event of system failure or inadvertent loss of data.

It is often a standard practice to automatically back-up data on a daily or other periodic basis and store this data on tape or disk.

There are several ways to back-up data for diagnostic and recovery purposes. One way is considered as (i) physical level back-up. The physical level back-up refers to the data as it is stored at specific locations on some physical media, such as a host computer disk.

Another way is (ii) designated logical level back-up. This refers to the data as seen by the user application programs in files or in database tables. Normally, the operating system of the computer will include a file system that does mapping between the physical level and the logical level. On doing the physical level back-up, this would involve making a raw copy from a computer disk to some other storage medium without going through the file system or some other physical to logical interpreter module. Then on the other hand, the back-up using the logical level would involve using such a thing as an interpreter module or some sort of a file system while doing back-up of physical to logical mapping.

A Database Management System consists of a set of tools used to develop and manage a database. The present system utilizes a DMSII which is a Database Management System available on the Unisys Corporation's ClearPath HMP NX, and the Unisys A-Series systems. A background for the Unisys DMSII systems is available in a publication of the Unisys Corporation, Document 8807 6625 000, entitled "*Getting Started With DMSII*" and published in September, 1997 by the Unisys Corporation. The DMSII Utilities provide database back-up and recovery capability for the entire database or for partial databases. The background operations of the DMSII utility enhancements are published in a Unisys Corporation publication Document 98037/4 and entitled "*DMSII Utility Enhancements*" published on Mar. 31, 1999.

Database back-ups can be accomplished for "on-line" and "off-line" bases. The on-line back-up will allow users to update data in the database, whereas the off-line back-up disallows all updates to the database. The back-ups can be done to either tapes or disks or any combination of both types of such media.

Database Management Systems are used by many large and small businesses such as airline reservation systems, financial institutions, retail chains, insurance companies, utility companies and government agencies. The present Database Management System (DMS) in its form as DMSII is used to build database structures for items of data according to some appropriate logical model, such as relational, hierarchical, or network. Further, the Database Management System is used to manage the database structures and keep the structures in some stable order while various application programs may be retrieving or changing the data. The present embodiment of DMSII has a data definition language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scalability by growing or shrinking the database according to the ongoing needs at the time.

The DMSII provides standard software files that perform services and operations for all the databases connected to the system's Enterprise Server. This enables a viewing of a list of all these files on the user terminal.

In the ordinary course of operations, the application program user will submit changes to data or retrieve data while running a particular application program. Then, changes can be made which add, modify and delete data. A Database Administrator (DBA) keeps the database running smoothly and enforces the rules for data integrity and security. Users access the database through a given application program which itself does not access the data directly. Instead, the program interacts with the DMSII software and the database tailored software, which is directed by the access routines of the Data Management System to provide accesses, retrievals and the storage of data in the physical database file.

In regard to access, an application user will access the data in order to (i) make an inquiry to get a Read of data in the database, or (ii) to provide an update by doing a Write to the database thus, adding, deleting or changing data. The access for either purpose contributes to an operation on the database which is called a "transaction".

A transaction is a sequence of operations grouped by a user program because the operations constitute a single logical change to the database, At the end and finality of the transaction point, the transaction is complete and without error, and it is considered as being committed to the database.

Actual real world data goes into special logical structures that are used by the Data Management System to store data. The database is designed to map categories of data into suitable structures. For example, the real world data would have a character with a structure called a "data set". An example of this would be a particular persons name. Then, real world data that can serve as an index of a whole data set has a structured name called a "set". This, for example, might be the social security number of any employee. Then there is data that can serve as an index of a data set under a certain condition, and this is called a "subset". This might be an employee's work number, for example. Then, there is data about each instance of a particular category. The structure name for this is "data item". An example of this might be the name and address of the category (person). Then, there is data related to the database as a whole, and this involves a structure called "global data item". An example of this might be the total number of employees in a company. Once there has been identification of the real-world data which is to be stored in the database, it is then necessary to define that data in relationship to the data structures of the data management system that holds data. When this data is defined within "structures", then the data management system and the system software programs an application program that can then understand how to make this data accessible for various inquiries and/or changes. This is done with the Data and Structure Definition Language (DASDL).

The Data Management System structures are the building Steps of the Data Management System database. Here, the "data set" has the purpose of storing data pertaining to a data category in a collection of records. A "set" has the purpose of indexing all records in a data set. A "subset" serves the purpose to index some records in a data set according to some given criteria. The "data item" is a structured name which defines a unit of information about a category in a given field (column) of a data set record. A "global data item" serves the purpose of storing a unit of information about the entire database or any of its involved structures. In general discussion about the types of data and the names of data structures, it is often seen that in a relational database, a "data set" is called a "table". A "set" or "subset" is frequently called an "index". A "data item" is often called a "field" or a "column", or is often called by its data name, for example, a project number. "Structures" are made of common file components designated as records and fields.

A record is a group of logically-related data items in a file. Often, a record is called a row. Data items reside in different fields in the records. For example, a record might involve a series of data such as an employee's name, the employee's I.D., the employee's social security number and years of employment. A group of such records would constitute a file.

The operating system which uses the data management system will treat the record as a unit. The system makes data available to users in records and not in individual single items of data. In programming languages, the record is the unit of data that the system reads from or writes to a file in one execution cycle of a Read or Write statement in a program.

If the application program wants to change a data item in a given record, the Data Management System brings a copy of the record from the physical storage over to memory, then enables that data item to be changed, and then writes the changed record back to the file.

A "field" is a consecutive group of bits or bytes within a particular component of a record which will represent a logical piece of data. A field or column is defined by the description of the data item it is to hold. For example, if one field carries the name of an employee, this field in the record could be called the name field.

The "data set" is a physical file, that is to say, a collection of related data records stored on a random-access storage device, such as a disk in which the data resides.

A data set is kept up-to-date in several ways: (i) here, application programs add, change, or delete individual pieces of data or records stored in the data set; (ii) the Database Administrator (DBA) maintains the structure of the data set by keeping the data set within certain maximized limits, by adding, deleting or changing the definition of a data item, creating new sets or subsets, monitoring automatic processes that guard data integrity and creating guard files to enhance the security of the data.

A "set" is a separate stored file that indexes all the records of a single data set. The Data Management System uses sets in order to locate records in a data set. A set has no meaning apart from its related data set. The set structure enables an application program to access all records of a data set in some logical sequence.

A "subset" can be considered identical to a set, except that the subset need not contain a record for every record of the data set. A subset is a file that indexes none, one, several, or all of the records in a data set. The subset structure enables an application program to access only records of a data set that meet a particularly required condition.

For example, an application program may compile a list of people who are "managers". Thus, it is seen that the database designer created the "manager" subset. Thus, in order to retrieve a record of managers, the data management system can use the smaller file, that is, the subset, to quickly point to the corresponding records in the larger file which is the data set. As with the set, the subset must also be kept up-to-date.

A "data item" is an element of data. In the Data Management System, a data item can also be the field (column) in the database record. For example, the social security number could be considered as a data item in the sample data set designated "person". The purpose of the data item is to describe the data to be stored. The data item provides the identity—type, size, location, and attributes—of one element of data for a database entity. When an application submits an update to a data item, the Data Management System will accept the update if it corresponds to the definition of a data item. Otherwise, the change is rejected and reported as an exception. The Database Administrator will add, delete or change the data item definitions. There are a number of data items that are used by the Data Management System. These include the type called "alpha-numeric" which include words and characters, names, addresses, dates and titles. Then, there are data items designated as "numeric" which involve integers and decimals with or without signs. Then, there are data items designated as "real" which involve single precision floating point numbers that occupy one word. An example of this would be, for example, an employee's salary. Then, there are data items which are called "Boolean" which involve TRUE and FALSE values.

The "global data item" is a data item, a group item, or a population item that is not part of any data set but still pertains to the database as a whole. Such global data items are stored in one special record called the "global record" in the DASDL declaration which is outside the structured definitions. Sometimes the global record is placed just before the structured definitions in the DASDL file. The global data item has the purpose of holding permanent information about the database as a whole or about a particular data set. It also acts as a place holder for information that can be derived from the database.

One of the most significant options in DASDL (Data And Structure Definition Language) is that it is possible to define the database as to whether the database is to be audited. The data management system supports both logging changes to a database (auditing the database) or not logging changes (maintaining an unaudited database). There are advantages in auditing a database since this assures the user that if a database failure occurs, there will be a record of database changes with which one can restore the database to a completely integral state and thus avoid loss of information and corruption of information.

The "audit trail" is a log of changes made to the database. This type of audit trail is somewhat similar to the SUMLOG in the host system which is the history of all system activity except for the fact that the audit trail will record the database update activity only and will consist of separate numbered files. Thus the data management system software can use an audit trail to recover the database from an unusable state, provide restart information to user programs, reconstruct portions of the database that had been lost because of hardware errors, back out aborted transactions and roll back the entire database to a user specified point or rebuild the entire database to a user-specified point.

The "audit file" provides a chronological history of all update database transactions. The audit file is a numbered segment of the database audit trail where the data management system assigns each audit file to have an audit file number (AFN) in the range of 1 to 9999.

Access Routines Program: The data management system controls access to database data with a software program called Access Routines which is a collection of specialized routines that enables many users to access the database all at the same time and ensures that the access is controlled so that accesses do not conflict with one another.

Control File: Each active data management system database has a control file. The control file contains the time stamps for the database software and files and the access routines since the access routines use time stamps to check the validity of data. A control file also contains the update levels of the database and the structures since the access routines use update levels to check the validity of data. Further, the control file functions to store audit control information, dynamic database parameters plus other information. It further guards the database from interruption while a process that needs exclusive access to the database goes on to complete its task successfully, such as, for example, a halt/load recovery and/or a reorganization. The control file assures that a database that has been interrupted for any reason is not accessed until the integrity of the database is further guaranteed by the successful completion of the recovery process.

I/O Operation: An I/O (Input/Output) operation is one in which the system reads data from or writes data to a file on a peripheral device, such as a disk drive. When there is a failure of a read or a write operation, then this is considered to be an I/O error, which must be handled.

Backup: The most important preventive maintenance task which can be performed for a database is to back up the database frequently and to keep the backups for some period of time. To "back up" the database, means to use the data management system DMUTILITY program to make a copy of all or part of the database. It should be noted that "back-up" is not the same as recovery. Recovery is the process that uses the backups to restore the database from some sort of failure. This backup will include a check of the physical integrity of all the database's structures being backed up. A complete database includes providing a reserve copy of all the files pertaining to the database. All the files include not only the database files and the control files (which may change from time to time) but also the DASDL source file, the description file, various tailored files, application programs, and audit files. This enables a user to put the database back in operation quickly in case the current database files should become unavailable or damaged.

Here there is involved the concept of "DUMP." A DUMP involves either a copy of stored data in which a change has been made since the previous DUMP of that data or a transfer of all or part of the contents of one section of computer storage to another section or to some other output device. The processes used to make a database are called "backing up" and "Dumping." A backup to tape is called a "Tape DUMP" while a backup to disk is called a "Disk DUMP."

Often the backing up operation for the database is done by increments. An increment is one of the series of regular consecutive additions, for example, if a database is too large to back up on a daily basis, the operator could create a schedule that backed up a certain number of database files (an increment) each day until the entire database was backed up.

The dump of a database is done to tape or disk depending on what type of storage resources are available. Tapes are most frequently used since they are the less expensive resource than disk. When dumping is done to tape, it is necessary to furnish information common to any disk-to-tape process and this information would include the tape name, the cycle number, the version number, workers, the serial number, compression and non-compression, the density, and the SCRATCHPOOL option.

However, when dumping to disk, it is only necessary to specify the file title for the entire dump and the number of DUMP files into which the system should place the DUMP.

One related art method to which the method of the present invention generally relates is described in U.S. Pat. No. 6,411,969 entitled "Enhanced System And Method For Management Of System Database Utilities". This related art method is an enhanced method for developing back-up copies of a source database by providing incremental and accumulate dump commands from various multiple-Users which enable a selection of certain files which are identified independently of time-factor for dumping selectively either onto a separate destination medium of disk or tape. A User can determine the block size of words for blocks of data files to be dumped onto the destination medium, thus significantly reducing the number of I/O operations required.

The present invention differs from the above prior cited art in that the prior invention, focuses on methods that create the incremental and accumulated backups. The method of the present invention differs in that it teaches methods to identify and provide full, incremental and accumulated backups to the database recovery process. The methods taught by the method of the present invention provide optimization of recovery process that is not provided by the prior related art patent.

Another related art method to which the method of the present invention generally relates is described in U.S. Pat. No. 5,974,425 entitled "Method And Apparatus For Reapplying Changes To A Database". This related art method is a method and apparatus for reapplying changes to a database uses a recovery log for recording all changes applied to the database so that the changes may be reapplied to the database during database recovery. Whenever a change is written to a storage device, the recovery log is updated to indicate that the particular change has been written to the storage device. During recovery, the data in the recovery log is sorted by file ID, data block ID, record type and version ID.

The present invention differs from the above prior cited art in that the prior invention, focuses on methods to reapply changes to a database by employing a recovery log. The prior related art method makes no reference to database backups as part of recovery. The method of the present invention differs in that it teaches methods to identify and provide the full, incremental and accumulated backups to the database recovery process in the correct order. The methods taught by the present invention provide optimization of recovery process that is not provided by the prior related art method.

SUMMARY OF THE INVENTION

Recovering a database means to get it back and ready up to date, ready for access with complete and correct data. The recovery of the database can be done either automatically or be done manually using various software utilities and commands.

The present system and method provides enhancements which reduce database recovery time by providing the capability for the software to automatically select the correct order of backups for a complete database recovery, relieving the user of the task of searching, and selecting the correct order of said backups. In the case where accumulated and incremental backups are involved, there is a certain order that dumps must be specified to be used to recovery a database: (a) the full dump must always be the first one to be specified, (b) at most one accumulated dump may be specified and if so must follow a full backup as the second in the list and (c) any number of incremental dumps may be specified and must be in the order that they were created from earliest to latest Software changes made in DMUTILITY and DMDUMP-DIR work to optimize the use of Incremental and Accumulated backups when the DMDUMPDIR database option is enabled. New syntax is introduced which allows the user to specify "RECOVER FROM MOST CURRENT FULL" or "RECOVER FROM MOST CURRENT ACCUM" or "RECOVER FROM MOST CURRENT". Depending on the specified syntax, a set of backups is identified from the DUMPDIRECTORY and provided to the recovery process as input. The DMUTILITY initiates the DMRECOVERY, and DMRECOVERY will perform the recovery process. The Database Operation Center (DOC) graphical interface will provide access to the "recovery for most current" enhancement through an enhanced Recovery dialog. The enhanced recovery dialog is the Database Operation Center (DOC) Recovery dialog that is enhanced to include the recovery from options "Most Current Dump", "Most Current Full Dump", and Most Current Accumulated Dump".

GLOSSARY OF SIGNIFICANT TERMS

ACCESS ROUTINES: A collection of special routines that coordinates access of a database by multiple Users at the same time, the Master Control Program ensures that only one copy of ACCESSROUTINES is active for each database.

ACCUMULATED DUMP: A database backup of all data sets, sets, and subsets that have been modified since the last full backup was performed]

ACC DUMP A1: ACC is an abbreviation for ACCUMULATED, A1 is an accumulated dump based on this display.

ACC DUMP A2: ACC is an abbreviation for ACCUMULATED, A2 is an accumulated dump based on this display.

ACTION COMMAND: A control signal that moves the user from one screen to another or manipulates data on the screen.

ACTION FIELD: A field that appears on a screen and begins with the prompt "Action:". The user enters the desired action for execution between the indicators to the right of this prompt.

ACTION LINE: The location on a screen where the Action field appears.

ADDRESS: (1) The identification of a location in storage (memory). (2) A sequence of bits, a character, or a group of characters that identifies a network station or a group of stations, a user, or an application. (3) The location of a device in the system configuration.

ALTERNATE RECORD KEY: A key, other than a prime record key, whose contents identify a record of an indexed file.

AREA: In a disk file, data is stored in groups of contiguous disk sectors called "areas" or rows. An area is measured in terms of logical records where a logical record is the amount of data that can be accessed by execution of one Read or Write statement in a program.

ARRAY: An ordered collection of a fixed number of common variables under one name.

AUDIT: In reference to computing, an examination of equipment, programs, activities, and procedures to determine how efficiently the overall system is performing, especially in terms of ensuring the integrity and security of data.

AUDITING: The process an operating system uses to detect and record security-related events, such as an attempt to create, to access, or to delete objects such as files and directories. The records of such events are stored in a file known as a "security log," whose contents are available only to those with proper clearance.

AUDIT TRAIL: In reference to computing, this is a means of tracing all activities affecting a piece of information, such as a data record, from the time it is entered into a system to the time it is removed from the system. An audit trail makes it possible to document, for example, who made changes to a particular record and when they did it.

AUTHENTICATION: In a multi-user or network operating system, the process by which the system validates a user's logon information. A users name and password are compared against an authorized list, and if the system detects a match, then access is granted to the extent specified in the permission list for that user.

AUTHORIZATION: In reference to computing, especially remote computers on a network, the right granted to an individual to use the system and the data stored in it. Authorization is technically set up by a system administrator and verified by the computer based on some form of user identification, such as a code number or password. Sometimes this is called "access privileges."

STEPING FACTOR: The number of logical records stored in a physical record on disk or tape.

STEPSIZE: A file attribute that gives the length of a file Step.

BOOLEAN: Pertaining to variables having a value of TRUE or FALSE.

BUFFER: An area in which data is stored temporarily.

CANDE: See Command and Edit.

CHECKPOINT: A place in a program where the program is to be stopped so that its current state can be written to disk. After the state of the program has been recorded, program execution resumes where it left off. If the system halts unexpectedly before the program finishes, the program can be restarted at its most recent checkpoint instead of at the beginning.

COBOL74: A version of the COBOL language that is compatible with the ANSI X3.23-1974 standard.

COMMAND AND EDIT (CANDE): A time-sharing Message Control System (MCS) that allows a user to create and edit files, and develop, test and execute programs, interactively.

COMPARE OPERATION: The set of steps that is performed by DMUTILITY after each backup session to validate that the data saved on disk or tape is free from Step checksum, Step sequencing, and I/O errors. It is done automatically, and a new option has been added to disable this operation.

COMPARE PHASE: After each database backup session, the DMUTILITY program automatically issues the compare operations to verify that the data written to tape or disk is free from Step checksum, Step sequencing, and I/O errors. This phase is referred to as the compare phase of the backup operation.

COMPILE-TIME OPTIONS: A set of options consisting of the two classes of options that can be set at compile time: i.e., compiler control options and compile-time default values and limit changes.

CTS9840 TAPE DRIVE: A SCSI (Small Computer Systems Interface—An ANSI standard) tape subsystem introduced by Storage Tek using a unique form of half-inch cartridge media and supporting 128 track density. A track is a longitudinal area on the tape along which a series of magnetic signals may be recorded. Software changes have been made to support this new tape device for DMUTILITY.

DASDL: Data And Structure Definition Language for defining the database.

DATABASE OPERATIONS CENTER: A graphical user interface (GUI) that provides a client-server front-end for Enterprise Database Server standard Edition and Enterprise Database Server Extended Edition database utilities on Unisys ClearPath servers.

DATA MANAGEMENT SYSTEM II (DMSII): A specialized system software package used to describe a database and maintain the relationships among the data elements in the database. Described in Unisys Publication Part No. 8807 6625-000, September 1997, entitled *Unisys: Getting Started With DMSII*.

DBA: The definition, design, maintenance, and use of a database (DMSII or other databases) and its related products which should be coordinated and controlled by a single administration. This control is typically established in the function of a Data Base Administration, abbreviated as DBA.

DISJOINT DATA SET: A data set is conceptually similar to a conventional file. It contains the actual records of information. A disjoint data set is a file that is not contained within another file. It is free standing.

DLT: This involves a tape storage technology developed by Digital Equipment Corporation to offer high speed storage for digital asset protection. This technology was later bought out by Quantum Corporation in 1994. This technology or DLT was three-to-four times faster and offered several multiples of capacity than previous tape storage units. It also practically eliminated most of the reliability problems that the earlier drives exhibited when used in heavy duty cycles. DLT uses a linear recording technology that simplifies the tape path and minimizes head-to-tape contact. This provides a drive that can read and write data all day long day after day apparently without data lost or failure.

DLT TAPE: DLT is an abbreviation for Digital Linear Tape. it is a high performance, high capacity, streaming cartridge tape produce designed for use on midrange and high-end computing systems.

DMDUMPDIR: A program that retrieves and modifies directory information for database dumps. When this program is enabled, directory entries are created automatically when a new database dump is created, or existing database dump is copied, or existing database dump is duplicated.

DMDUMPDIRLIB: The SYSTEM/DMDUMPDIR/LIBRARY program which contains processes to create and process the maindirectory and dumpdirectories for a database.

DMSII: See Data Management System II.

DMUTILITY: This is a program which will parse the new syntax to scan for the Exclude keyword and to build a dump list to reflect that specific disjoint data set and all of its sublevel structures which are to be excluded from the dump.

DUMP: A database backup.

DUMP IS FULL: Equivalent to FULL DUMP, it is a backup of every database file for a given database.

DUMP DIRECTORY: One dump directory file exists for each entry in the main directory. Each dump directory file contains information about one database backup.

DUMP OUTPUT LISTING: Following the execution of each dump command, an output listing will be sent to a session printer backup file so the user can have hard copies of the dump directory and files that were included in the dump operation.

DUMP TO DISK: Software for speeding up the dump to disk operation where software changes are made to optimize existing disk read and write operations. Performance gain is accomplished through expansion of buffer sizes which reduces the number of I/Os required.

DUMP TO TAPE SESSION: A database backup is a snapshot of an entire database or of parts of a database. The backup can later be used to recover lost data, or transfer the database from one location to another. One of the features in a DMUTILITY DUMP command is to create a backup copy of the database on tape. When this command has been executed, a Dump to Tape session will be initiated.

DUMPSTAMP: This is a selected option which allows for a special word to be allocated into each Step of word value when any Step gets modified and this value gets stored in each Step when DUMPSTAMP is enabled.

DUMP VERIFICATION: Same as the definition for "Compare Operation."

ENHANCED RECOVERY DIALOG: It is the Database Operation Center (DOC) Recovery dialog that was enhanced to include the recovery syntax from "Most Current Dump", "Most Current Full Dump", and "most Current Accumulated Dump".

EXCLUDE KEYWORD: New syntax to be added to DMUTILITY program to allow users to exclude certain database files in a dump command. This is useful when the excluded files have been backed up previously and no new changes have been made that require new backup to tape or disk.

EXCLUDE PARAMETER: This is for the DMUTILITY Dump command which has the purpose of excluding one or more structures from the database dump. This new feature provides flexibility to the current Dump command and is especially helpful when a small percent of the structures are being excluded from the Dump operation. This command is supported for the DMUTILITY Dumps with all the files selected, and it allows user to select one or more disjoint data sets and all of the structures associated with it (sets, subsets, embedded structures, etc.) which are to be excluded from each dump session.

FILE NAME: (1) A unique identifier for a file, consisting of 1 to 14 name constants separated by slashes. Each name constant consists of 1 to 17 letters, digits, hyphens, and/or underscores. A file name can be optionally preceded by an asterisk (*) or usercode, and optionally followed by ON and a family name. (2) In RPG, a name that designates a set of data items. (3) In COBOL, a user-defined word that names a file described in a file description entry or a sort-merge file description entry within the FILE SECTION of the DATA DIVISION.

FULL DUMP: A whole database backup.

GARBAGE COLLECTION: In Data Management System II (DMSII), the process of consolidating deleted or unused space in data sets, sets, and subsets, and returning this space to the system.

HALT/LOAD: A system-initialization procedure that temporarily halts the system and loads the Master Control Program (MCP) from disk or pack to main memory.

HELP TEXT: Information displayed online when a user presses the specify (SPCFY) key or enters the HELP or TEACH command along with a keyword.

INCREMENTAL DUMP: A database backup of all data sets, sets, and subsets that have been modified since the last full, accumulated, or incremental backup.

INCREMENTAL DUMP I1: Same as INCR DUMP I1.

INCREMENTAL DUMP I2: Same as INCR DUMP I2.

INDEXED ORGANIZATION: The permanent, logical file structure in which each record is identified by the value of one or more keys within that record.

INDEXED SEQUENTIAL ACCESS METHOD (ISAM): A method that provides efficient, flexible random access to records identified by keys stored in an index.

ISAM: See Indexed Sequential Access Method.

KEY: (1) A field used to locate or identify a record in an indexed file. (2) In COBOL, a data item that identifies the location of a record, or a group of data items that identifies the ordering of data. (3) In Data Management System II (DMSII), a field that serves as a retrieval key for a set or subset.

KEY OF REFERENCE: In COBOL, the prime or alternate key currently being used to access records within an indexed file.

KIND: The file attribute that indicates the type of device on which the file is stored.

LABEL: (1) The first 28 sectors on a disk, on which information about the disk is stored. This information includes the family name and serial number, the Master Available Table (MAT), the family index number, information about the family's base pack, and a pointer to the system directory if the disk contains a directory. (2) In RPG and ALGOL, a name that identifies either a point in the Calculation Specifications where a GOTO operation branches or the beginning of a subroutine.

LIBRARY: (1) A collection of one or more named routines or entry points that are stored in a file and can be called by other programs. (2) A program that exports objects for use by user programs.

LIBRARY DIRECTORY: A memory structure associated with a library process stack that describes the objects exported by the library process.

LIBRARY PROCESS: An instance of the execution of a library. The sharing option of a library determines whether multiple user programs use the same instance of the library.

MAIN DIRECTORY: A file that contains one entry for each database backup for which you want to store information.

The information stored in this file is used in locating the required database backups for restoring the database.

MAJOR KEY: The first key in a complex key.

MINOR KEY: Any key in a complex key that is not the major (first) key.

MIX: The set of processes that currently exist on a particular computer. The mix can include active, scheduled, and suspended processes.

MIX NUMBER: A 4-digit number that identifies a process while it is executing. This number is stored in the MIX-NUMBER task attribute.

MOST CURRENT ACCUMULATION: The DMUTILITY and DMDUMPDIR programs allows recovery using the RECOVER FROM MOST CURRENT ACCUM construct to automatically access the correct dumps when you want the most current full and accumulated backup. This recovery occurs even when corresponding incremental backups exist.

NO COMPARE OPTION: This involves another option whereby normally the DMUTILITY currently performs a compare operation automatically after each dump operation. Here, there is provided a new option called No Compare which will be available to the user so that the compare phase will be an optional choice. This feature is useful to users for the possibility of running verification of the dump with the VERIFYDUMP command at a later time.

NO MORE DUMPS: During the search of a certain dump, when the whole array of dump names and dump information has been searched and the dump is not found.

NUMERICAL GENERATOR: This is the unit in ACCESSROUTINES which generates a unique number for each data Step.

ODT: See Operator Display Terminal

OPERATOR DISPLAY TERMINAL (ODT): (1) A system Control Terminal (SCT) configured for direct communication with the operating system. The ODT is used primarily by operations personnel for entering commands that control and direct the system and its resources. (2) The name given to the System Control Terminal (SCT) when it is used as an ODT.

PARAMETER: (1) A quantity or item of information that can be given a different value each time a process is repeated. (2) An identifier associated in a special way with a procedure. A parameter is declared in the procedure heading and is automatically assigned a value when the procedure is invoked. (3) An object or value that is passed from an actual parameter and received by a formal parameter.

PRIME RECORD KEY: A key with contents that identify a record in an indexed file.

PROCEDURE: (1) A Step that can be invoked by statements elsewhere in the same program or, in some cases, by statements in another program. In most cases, a procedure has a procedure heading and a procedure body. Examples are a procedure in ALGOL, a procedure or function in Pascal, a subroutine or function in FORTRAN, or a complete COBOL program. (2) In COBOL, a paragraph or group of logically successive paragraphs, or a section or group of logically successive sections, within the PROCEDURE DIVISION.

READING FROM LAST TO FIRST IN A DUMP: Searching the array that contains the dump names and dump information starting at the last entry to the first entry until the specific dump is found.

RECORD KEY: A key, either the prime record key or an alternate record key, with contents that identify a record within an indexed file.

RECOVER FROM MOST CURRENT FULL SYNTAX: The DMUTILITY and DMDUMPDIR programs allows recovery using the RECOVER FROM MOST CURRENT FULL construct to automatically access the most current full backup with the database DUMPSTAMP option enabled. This recovery occurs even when corresponding incremental backups exist. Even when corresponding accumulated backups, incremental backups, or both backups exist.

RECOVER FROM MOST CURRENTACC SYNTAX: Same as MOST CURRENT ACCUMULATION.

RECOVER FROM MOST CURRENT SYNTAX: The DMUTILITY and DMDUMPDIR programs allows recovery using the RECOVER FROM MOST CURRENT construct to automatically access the correct dumps when incremental and accumulated backups exist. The database DUMPSTAMP option enables the creation of the incremental and accumulated backups.

RESULT DESCRIPTOR: A 48-bit word that is the standard Data Management System II (DMSII) exception word. A result descriptor includes the exception category and subcategory, and the structure number involved. When an exception occurs, the last bit in the 48-bit word is set to 1. When an operation is successful, the 48-bit word contains all zeros.

RPG: Report Program Generator. A high-level, commercially oriented programming language used most frequently to produce reports based on information derived from data files.

SERIAL NUMBER: This involves the display serial number whereby the program DMUTILITY will display the serial number of the tape, which contains the latest directory information in the dump output listing. This information is helpful for Database Administrators for subsequent DMUTILITY runs. In old systems, the Serial Number information was displayed when DMDUMPDIR is enabled. However, this can be improved in order to have this available in the DMUTILITY program without the need to use DMDUMPDIR.

SERIAL NUMBER INTERFACE: This is for the purpose of displaying the tape serial number of the latest version tape in the dump output after each Dump to Tape session has completed. The tape serial number information is currently available by enabling the option DMDUMPDIR. In most cases, a database fits in multiple volumes and there will be only one serial number that the DBA needs to know, for obtaining the latest version of tape, and this information will be available through DMUTILITY.

SUPPORT LIBRARY: A library that is associated with a function name. User programs can access a support library by way of its function name instead of its code file title. The operator uses the SL (Support Library) Operator Display Terminal (ODT) command to link function names with libraries.

SYMBOLIC FILE: A file that contains a source program.

TRANSTAMP: A value which is generated by the Numerical Generator unit.

VERIFYDUMP A command which will check the dump file against errors such as Step checksum, error step sequencing error, and I/O errors. If a problem has been detected, an error message will be displayed.

DESCRIPTION OF PREFERRED EMBODIMENT

Figure 1:
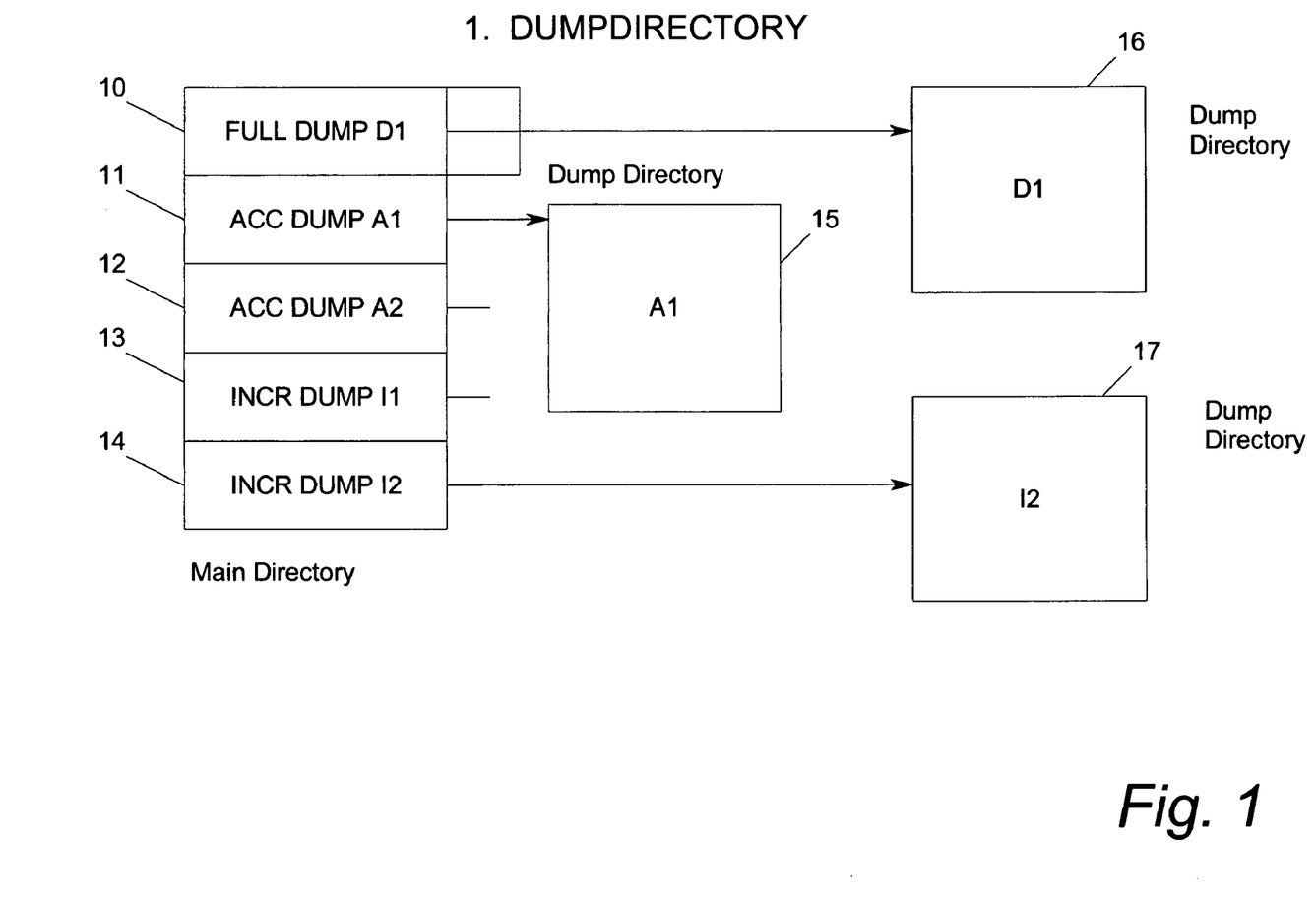
FIG. 1 is a schematic drawing showing the MAIN DIRECTORY and the logged database backups (DUMP DIRECTORIES).

FIG. 1 shows a schematic drawing of the MAIN DIRECTORY and the DUMP DIRECTORIES. The MAIN DIRECTORY shows the logged backups, such as FULL DUMP D1 (Item 10), ACC DUMP A1 (Accumulated DUMP) at Item 11, ACC DUMP A2 (Item 12), INCR DUMP I1 (INCREMENTAL DUMP) at Item 13, and INCR DUMP I2 (Item 14). The secure data contained in these Dumps, such as address, social security number, etc, is passed to the DUMP DIRECTORIES A1 (Dump Directory 15), I2 (Dump Directory 17), and D1 (Dump Directory 16).

Figure 2:
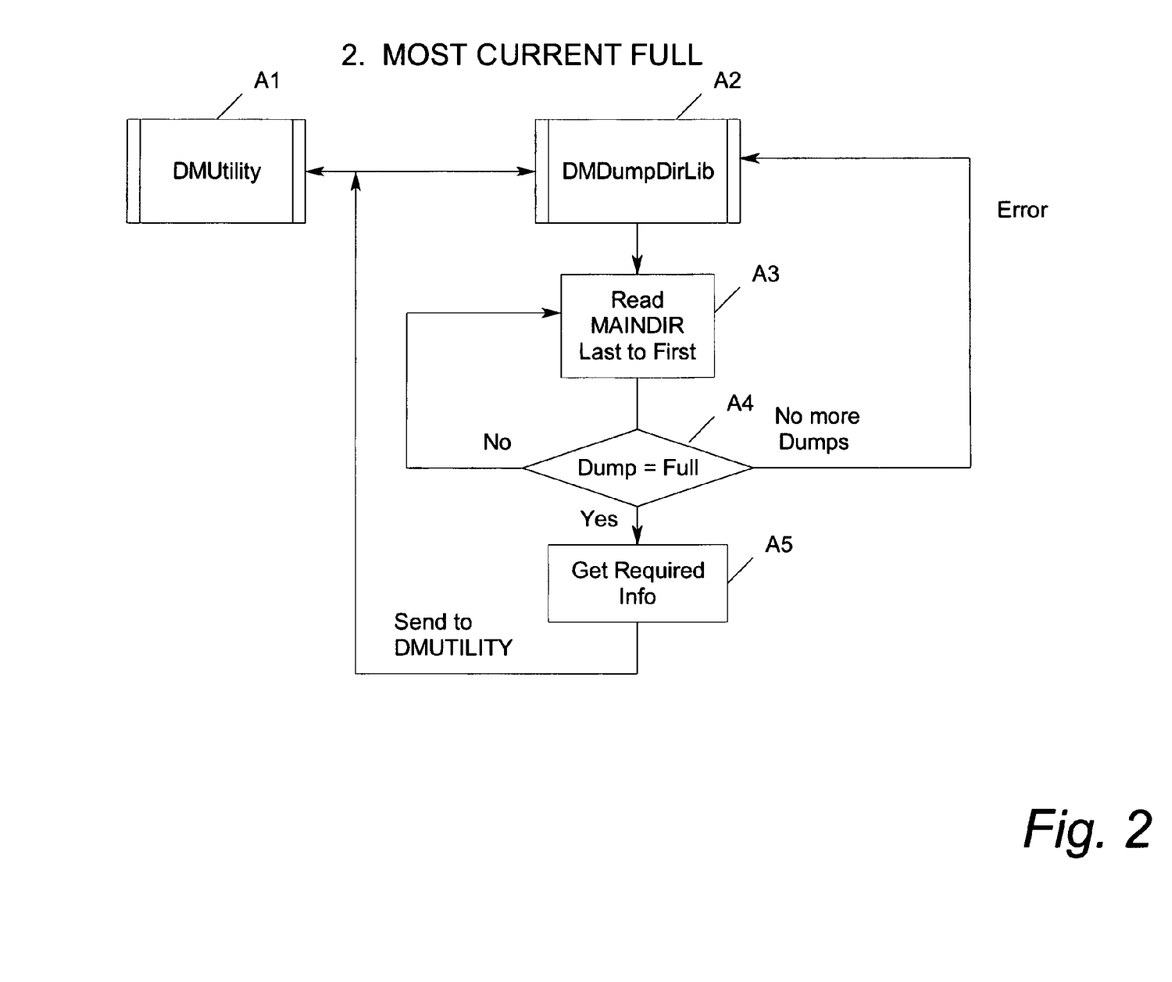
FIG. 2 is a flowchart showing the steps involved in performing the "RECOVER FROM MOST CURRENT FULL" syntax using the new feature.

FIG. 2 illustrates a flowchart which shows the steps of performing the "RECOVER FROM MOST CURRENT FULL" syntax. The DMUTILITY (Step A1), and DMDUMPDIRLIB (Step A2), pass data to each other, while the DMDUMPDIRLIB then reads the MAIN DIRECTORY from Last to First (Step A3). The main directory file will be read and dump names and dump information will be stored in the array. The array will be searched starting from the last dump entry to the first dump entry until a full dump is found. If no dump is found, an error will be sent back to DMUTILITY. If the dump is found, the dump directory of that dump will be read to get the required information to send back to DMUTILITY. An inquiry is then made at Diamond A4 to check if the Dump is full. If there are no More Dumps, an error is received, and the process begins again at Step A2 at the DMDUMPDIRLIB. If the answer to inquiry A4 is No, and the Dump is not full, the process returns to the MAIN DIRECTORY to read from last to first again (Step A3). If the Dump is full (Yes, to inquiry A4), a process to get the required information is initiated (Step A5), and is sent to the DMUTILITY (Step A1). The information that is sent back to the DMUTILITY will automatically access the correct set of backups in the correct order when the DMUTILITY RECOVER FROM MOST CURRENT syntax is used. An example of the information is:

STRUCTURE NUMBER
FORMAT DATE/TIME STAMP
CREATION DATE/TIME STAMP
PACKNAME OF STR
NUMBER OF ROWS DUMPED
NUM OF ROWS IN STRUCTURE
VERSION TIMESTAMP
FILE STATES
INDEX OF FAMILYNAME
TOTAL SECTIONS
FILE SECTION NUM
WORDS PER BLOCK

Figure 3:
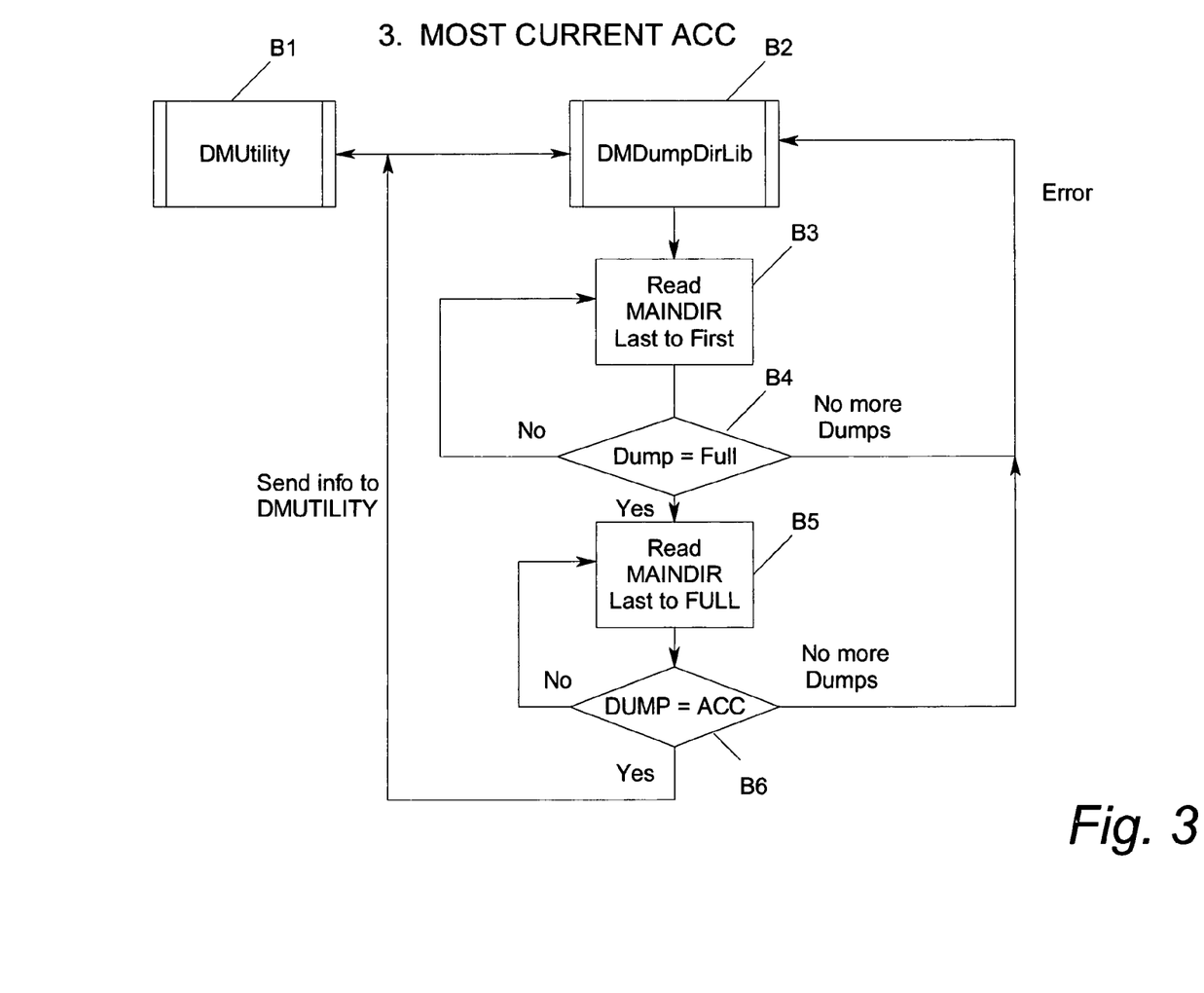
FIG. 3 is a flowchart showing the steps involved in performing the "RECOVER FROM MOST CURRENT ACC" syntax using the new feature.

FIG. 3 illustrates a flowchart which shows the steps of performing the "RECOVER FROM MOST CURRENT ACC". The DMUTILITY (Step B1), and DMDUMPDIRLIB (Step B2), pass data to each other, while the DMDUMPDIRLIB then reads the MAIN DIRECTORY from Last to First (Step B3). Reading from last to Full, the search for accumulated dump will be done from the last entry of the array to full dump entry only. An inquiry is then made at Diamond B4 to check if the Dump is full. If there are no More Dumps, an error is received, and the process begins again at Step B2 at the DMDUMPDIRLIB. If the answer to inquiry B4 is No, and the Dump is not full, the process returns to the MAIN DIRECTORY to read from last to first again (Step B3). If the Dump is full (Yes, to inquiry B4), a process to read the MAIN DIRECTORY from Last to FULL is initiated (Step B5). Another inquiry is then made at Diamond B6 to check if the DUMP is ACCUMULATED. If the DUMP is not ACCUMULATED (No to inquiry B6), the MAIN DIRECTORY is read from Last to FULL again at Step B5). If there are no more Dumps, an error is received and the process returns to the DMDUMPDIRLIB (Step B2). If the DUMP is ACCUMULATED (Yes to inquiry B6), the information is sent to DMUTILITY (Step B1).

Figure 4:
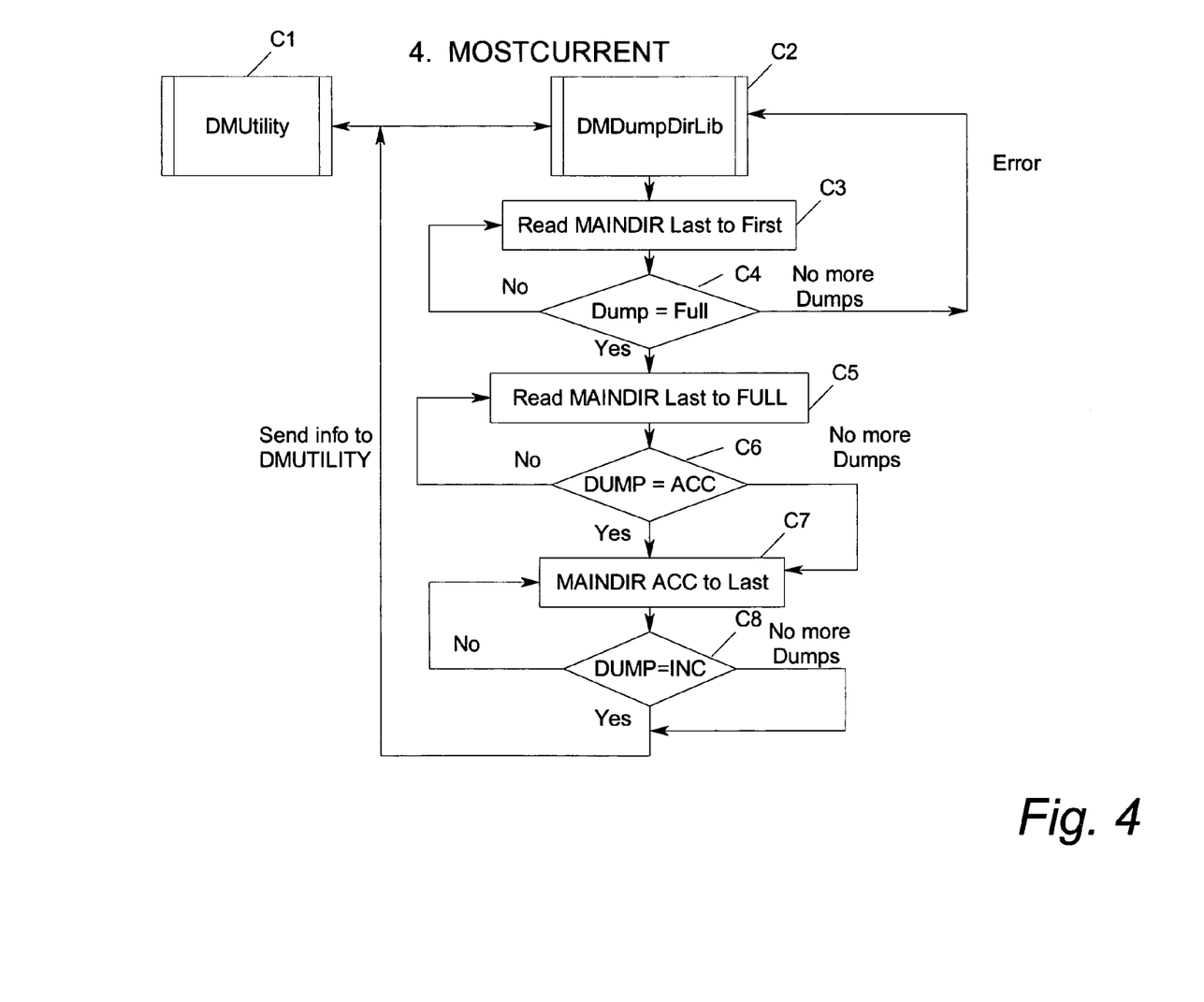
FIG. 4 is a flowchart showing the steps involved in performing the "RECOVER FROM MOST CURRENT" syntax using the new feature.

FIG. 4 is a flowchart that illustrates the steps for performing the "RECOVER FROM MOST CURRENT" syntax. The DMUTILITY (Step C1), and DMDUMPDIRLIB (Step C2), pass data to each other, while the DMDUMPDIRLIB then reads the MAIN DIRECTORY from Last to First (Step C3). An inquiry is then made at Diamond C4 to check if the Dump is full. If there are no More Dumps, an error is received, and the process begins again at Step C2 at the DMDUMPDIRLIB. If the answer to inquiry C4 is No, and the Dump is not full, the process returns to the MAIN DIRECTORY to read from last to first again (Step C3). If the Dump is full (Yes, to inquiry C4), a process to read the MAIN DIRECTORY from Last to FULL is initiated (Step C5). Another inquiry is then made at Diamond C6 to check if the DUMP is ACCUMULATED. If the DUMP is not ACCUMULATED (No to inquiry C6), the MAIN DIRECTORY is read from Last to FULL again at Step C5. If there are no more Dumps, an error is received and the process returns to the DMDUMPDIRLIB (Step C2). If the DUMP is ACCUMULATED (Yes to inquiry C6), the MAIN DIRECTORY is read from Full to Last at Step C7. Another inquiry is then made at Diamond C8 to check if the DUMP is INCREMENTAL. If the answer to inquiry C8 is No, the MAIN DIRECTORY is read from Full to Last again at Step C7. If the answer to inquiry C8 is Yes, and the DUMP is INCREMENTAL or there are no more Dumps, the information is sent to DMUTILITY at Step C1. It should be noted that if there are more incremental dumps, the search will start from the last incremental dump found to the last entry of the array.

Figure 5:
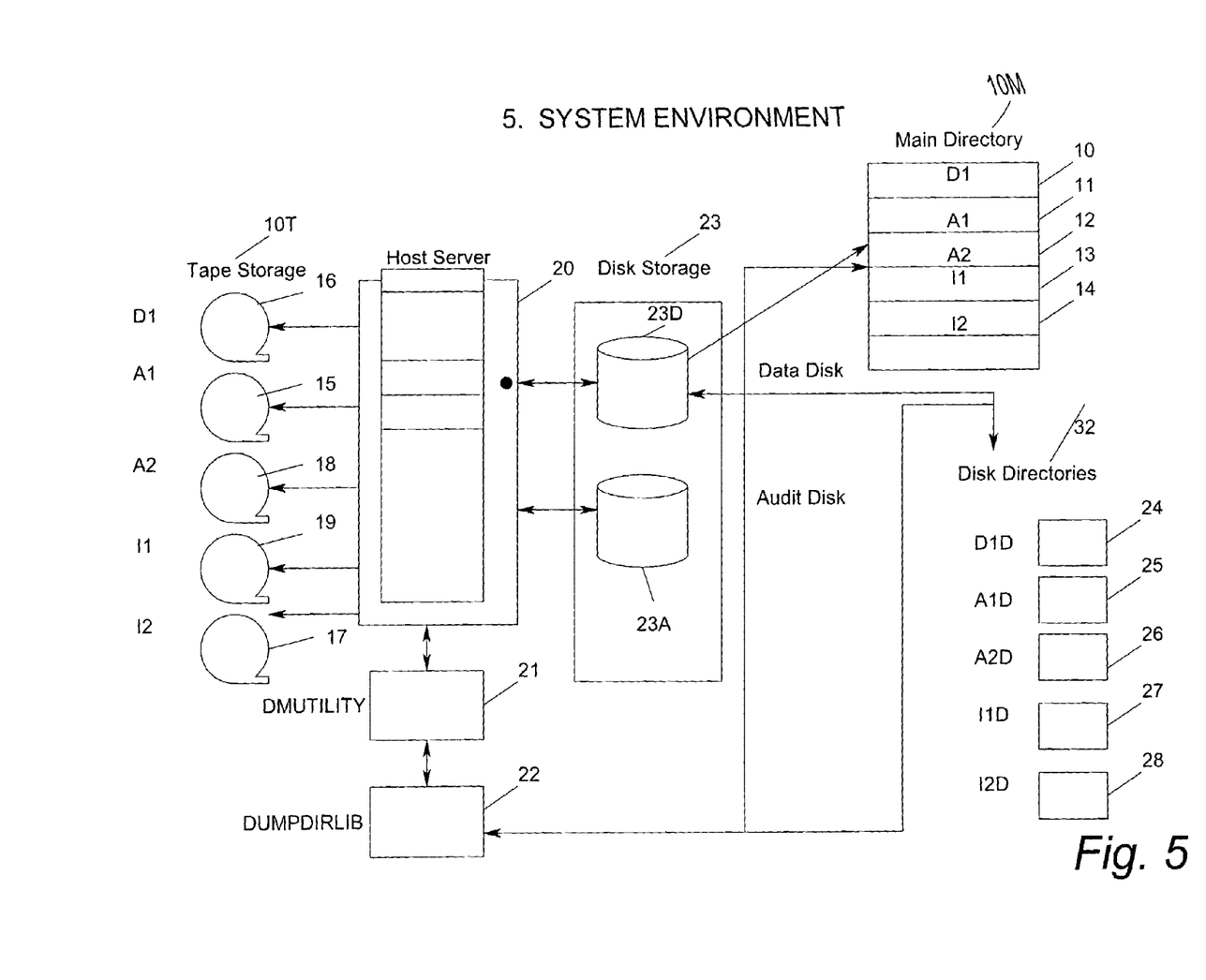
FIG. 5 is an environmental drawing in which the method of the present invention is used.
Figure 6:
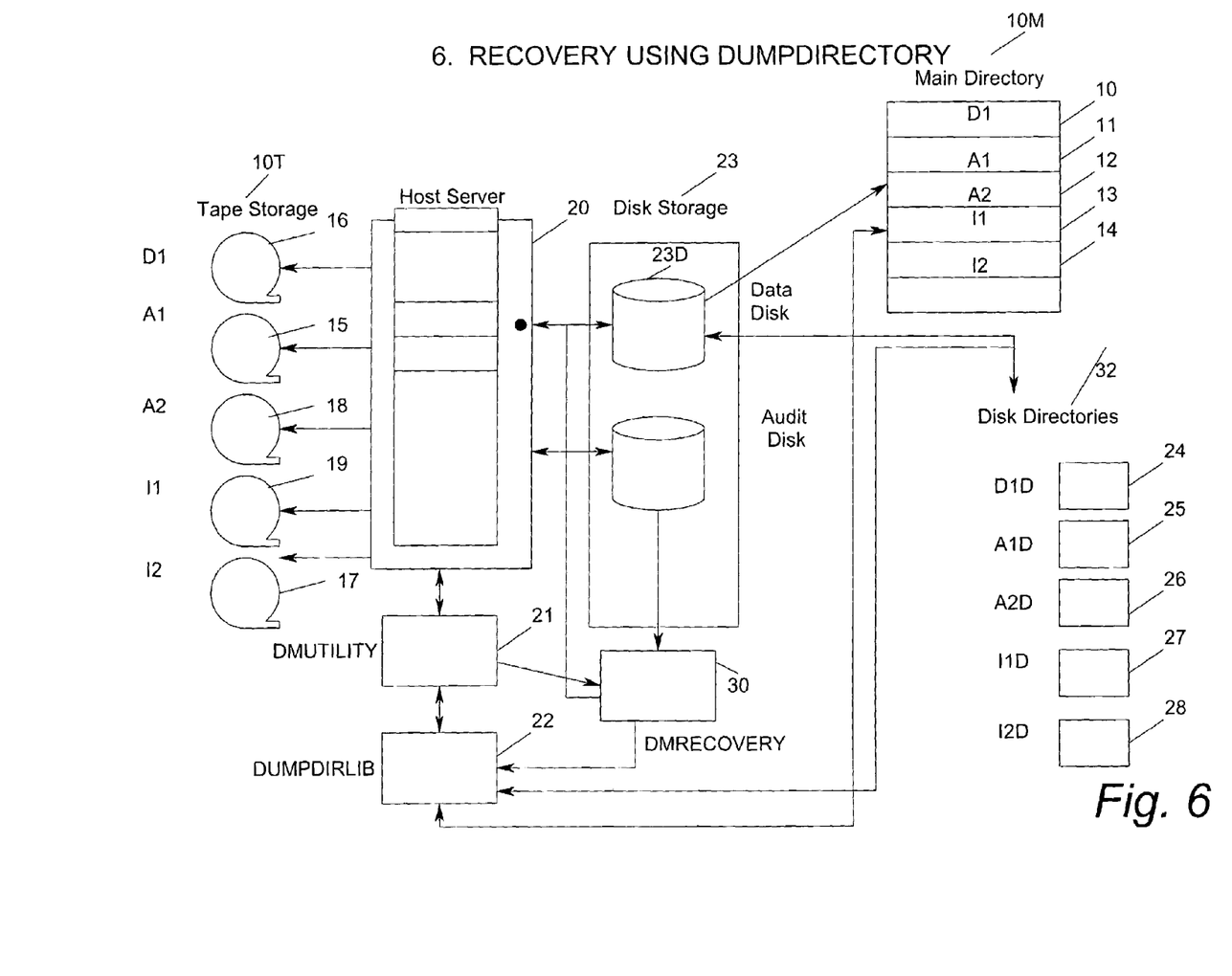
FIG. 6 is an environmental drawing in which the recovery method using DUMPDIRECTORY is shown.

To take a functional overview on FIGS. 5 and 6, we can first look at the Tape Storage 10T where tape 16(D1) holds the full dump which the host server 20 retrieved from the Data Disk 23D. A disk storage module 23 holds a Data Disk 23D and an Audit Disk 23A which communicates with the Host Server 20 and DM RECOVERY module 30. Likewise, the Accumulated Dump files placed in tape 15(A1) and Tape 18(A2). Then tapes 19 and 17 hold the Incremental files for I1 and I2. The DMUTILITY program 21 initiates the data to be dumped into tape storage 10T by the server 20 from the data disk 23D. Audit Disk 23A also communicates in FIG. 6 to the Host Server 20 and DM RECOVERY module 30. When these backups are initiated, the DumpDirLibrary 22 will log this information into the Main Directory 10M so that the Main Directory 10M will now have the names of the dumps in a particular order of sequence—so that first is the FULL Dump 10(D1), then ACCUMULATED Dumps 11(A1) and 12(A2), then INCREMENTAL Dumps 13(I1) and 14(I2). The Main Directory 10M acts like a Table of Contents by name, but the actual files for these dumps is taken by the DumpDir Library 22 and placed in the Disk Directories 32 which will hold the precise contents of files for each type of dump. Thus, Directory section 24 (DID) holds the FULL Dump, while section 25(A1D) and 26(A2D) holds the ACCUMULATED dump file and 27(I1D) and 28(I2D) hold the concise INCREMENTAL dump files.

Now as to the RECOVERY operation, a command to DMUTILITY 21 starts the recovery process and the DUMP-DIR Library 22 goes to the Main Directory 10M and gets a list of all the dumps. It then sends the list in the correct order sequence of dump files as input to the System DMUTILITY 21.

The Main Directory 10M has been logged so that the Dumps are in the order of their creation—FULL Dump D1, ACCUMULATED Dumps A1 and A2, INCREMENTAL Dumps I1 and I2. So with this sequential setup, the recovery process can occur in the correct sequential order to restore the Data Disk 23d in the proper and correct sequence. The recovery can take several different aspects—you can do a recovery by just using the FULL Dump (D1) where the precise data files will be retrieved from Disk Directory 24(D1D). This is done by the DUMP Dir Library 22 working through DMUTILITY 21 and System RECOVERY 30.

One would not just use the ACCUMULATED Dump alone, one would use the FULL Dump (D1) and the ACCUMULATED DUMP A2(12) plus A2D(26) as these are the "most current" data files. The most current dump files would be D1 and A2 and I2 plus I1. The system operates automatically during RECOVERY to handle the correct sequence of FULL to ACCUMULATED to INCREMENTAL. Operations are from the mostly recently created dump files down to the earlier created dump files. The Main Directory 10M and the Disk Directories 32 support each other so that each entry in the Main Directory 10M is supported by a corresponding detail file in the Disk Directory 32.

The action of the RECOVERY process is substantially speeded up because the correct rebuilding sequence has been set up in the Main Directory 10M. If the automatic sequence were not available in the Main Directory, then the user would have to key in the name of each of the dumps and then carefully sort the list of dump names into the correct sequential order and then apply the results to the recovery disk 23d. But now with the organized Main Directory 10M, the sequential order has been supplied and the DMRecovery Program can directly load the recovery disk 23D so that it is immediately updated correctly and now available for read-write operations.

Described herein has been an improved system for database recovery. A new method has been introduced to teach a method to retrieve "automatically" a complete set of backup names, saving the user from having to research and manually type the backup names to be used in the event of a database recovery.

While one embodiment of the invention has been illustrated, there may be other embodiments which are still encompassed by the subject invention as described by the following claims.

What is claimed is:

1. A system for reducing time in a server-database network where various types of dump operations are categorized in a dump directory for automatic sequential selection to execute a recovery operation comprising:
   (a) data storage means for providing disk means for holding database files available for read-write access by a server means;
   (b) means to initiate and to enable operations with said disk means to create special sets of backup dump files on a tape storage means, wherein said means to initiate and create special sets of backup dump files includes:
      (b1) means for creating a FULL dump file;
      (b2) means for creating a set of ACCUMULATED dump files;
      (b3) means for creating a set of INCREMENTAL dump files;
   (c) said tape storage means for holding said special set of backup dump files;
   (d) means for creating a Main Directory in a correct sequential order and which has a log of the special sets of backup dump files from said tape means, said correct sequential order involving dumps which are accessed in the following order:
      (i) a most recent FULL DUMP;
      (ii) a most recent ACCUMULATED dump;
      (iii) a most recent set of INCREMENTAL dumps;
   (e) recovery means for selecting and placing said special sets of backup dump files into said disk means to establish an updated and operable database.

2. The system of claim 1 wherein said means (d) additionally creates a Disk Directory which provides detailed disk sub directories of said dump files for each dump logged in said Main Directory.

3. The system of claim 2 wherein said recovery means utilizes said sub-directories for restoring updated data files in said disk means.

4. The system of claim 2 wherein said disk sub-directories of each dump logged in said Main Directory include:
   (i) a Full Dump;
   (ii) ACCUMULATED dumps;
   (iii) INCREMENTAL dumps.

5. The system of claim 2 wherein said recovery means (e) includes:
   (e1) SYSTEM RECOVERY program means to enable the production of an updated database including:
      (e1a) said DUMP DIR Library means for accessing said sets of dump files from said Main Directory and said Disk Directories for conveyance to said recovery means;
      (e1b) said means for conveying said sets of dump files from said Disk Directories to said recovery means;
      (e1c) means for transporting said dump files to said recovery disk to provide an updated database.

6. The system of claim 4 wherein said dumps (i), (ii), and (iii) are placed in the correct sequential order so that the said recovery means will automatically restore said database in the correct sequential order onto disk means.

7. The system of claim 6 wherein said correct sequential order operates such that the most-recently created dump file is the first to be restored, then sequentially the next more recently dump file and so on until the last created dump file (earliest in time) has been restored.

8. The system of claim 6 wherein said correct sequential order of any dump recovery operates by accessing the sequence from the last item to the first item in the dump.

* * * * *